United States Patent
Wu et al.

(10) Patent No.: US 12,116,922 B2
(45) Date of Patent: Oct. 15, 2024

(54) ACCELERATED CATALYST REACTIVATION CONTROL STRATEGY FOR GASOLINE VEHICLE EMISSIONS SYSTEM IN CONJUNCTION WITH N2 SELECTIVE CATALYST TO MINIMIZE NOX REMAKE

(71) Applicant: Ford Global Technologies, LLC, Dearborn, MI (US)

(72) Inventors: Jason Wu, Birmingham, MI (US); Eva Thanasiu, Trenton, MI (US); Giovanni Cavataio, Dearborn, MI (US); Carolyn Parks Hubbard, Canton, MI (US); Andrew Gregory Getsoian, Canton, MI (US); Yisun Cheng, Bloomfield Hills, MI (US); Natalie Roxas, Ferndale, MI (US); Michael James Uhrich, Wixom, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 18/301,586

(22) Filed: Apr. 17, 2023

(65) Prior Publication Data
US 2023/0250747 A1    Aug. 10, 2023

Related U.S. Application Data

(62) Division of application No. 17/240,280, filed on Apr. 26, 2021, now Pat. No. 11,629,627.

(51) Int. Cl.
*F01N 9/00* (2006.01)
*B01D 53/94* (2006.01)
(Continued)

(52) U.S. Cl.
CPC ............ *F01N 9/00* (2013.01); *B01D 53/945* (2013.01); *B01D 53/9472* (2013.01); *B01D 53/9477* (2013.01); *B01D 53/9495* (2013.01); *F01N 3/101* (2013.01); *F01N 3/105* (2013.01); *F01N 3/2803* (2013.01); *B01D 2255/1021* (2013.01); *B01D 2255/1023* (2013.01); *B01D 2255/1025* (2013.01); *B01D 2255/2065* (2013.01);
(Continued)

(58) Field of Classification Search
CPC . F01N 9/00; F01N 3/101; F01N 3/105; F01N 3/2803; F01N 2370/02; F01N 2900/08; F01N 2900/1402; F01N 2900/1614; F01N 2560/026; F01N 13/009; F01N 2560/025; F01N 2900/1624; F01N 3/20; F01N 11/00; F01N 11/007; B01D 53/945; B01D 53/9472; B01D 53/9477; B01D 53/9495; B01D 2255/1021; B01D 2255/1023; B01D 2255/1025; B01D 2255/2065; B01D 2255/20715; B01D 2255/9032; B01D 2255/904; B01D 2255/908; B01D 53/9468; B01D 2255/407; Y02T 10/40; Y02T 10/12; Y02A 50/20
See application file for complete search history.

(56) References Cited

U.S. PATENT DOCUMENTS 10,072,545 B2 *  9/2018  Hirooka ................... F01N 3/20

* cited by examiner

*Primary Examiner* — Brandon D Lee
(74) *Attorney, Agent, or Firm* — Burris Law, PLLC

(57) ABSTRACT

A catalytic converter system having oxygen storage materials is disclosed and methods for determining whether to reactivate oxygen storage materials and monitoring failure events of the oxygen storage materials are also disclosed.

20 Claims, 4 Drawing Sheets

(51) Int. Cl.
*F01N 3/10* (2006.01)
*F01N 3/28* (2006.01)

(52) U.S. Cl.
CPC .............. *B01D 2255/20715* (2013.01); *B01D 2255/9032* (2013.01); *B01D 2255/904* (2013.01); *B01D 2255/908* (2013.01); *F01N 2370/02* (2013.01); *F01N 2900/08* (2013.01); *F01N 2900/1402* (2013.01); *F01N 2900/1614* (2013.01)

ACCELERATED CATALYST REACTIVATION CONTROL STRATEGY FOR GASOLINE VEHICLE EMISSIONS SYSTEM IN CONJUNCTION WITH N2 SELECTIVE CATALYST TO MINIMIZE NOX REMAKE

CROSS-REFERENCE TO RELATED APPLICATION

This application is a divisional application of U.S. patent application Ser. No. 17/240,280, filed on Apr. 26, 2021. The disclosure of the above application is incorporated herein by reference.

FIELD

The present disclosure relates to oxygen storage capacity materials.

BACKGROUND

The statements in this section merely provide background information related to the present disclosure and may not constitute prior art.

During the combustion process in combustion engines, gasoline is oxidized and hydrogen and carbon combine with air, forming exhaust gas. The formed exhaust gas includes carbon dioxide, carbon monoxide, nitrogen oxides, hydrocarbons, and water.

Automobile exhaust systems include a three-way catalytic converter to assist with oxidizing the formed carbon monoxide, hydrocarbons, and nitrogen oxides gases into carbon dioxide, nitrogen, and water. Such automobile exhaust systems are periodically monitored for proper conversion capability. Typical monitoring methods include monitoring the air-to-fuel (A/F) ratio with at least an oxygen sensor. The oxygen sensor detects the oxygen concentration in the exhaust gas for determining the A/F ratio. The A/F ratio is maintained as close to a stoichiometrically balanced composition as possible so that the concentrations of oxidizing gases, namely, nitrogen oxides and oxygen, are balanced against the concentrations of reducing gases, namely, hydrocarbons and carbon monoxide. In theory, when the A/F ratio is stoichiometrically balanced, it should be possible to produce only carbon dioxide, water, and nitrogen exhaust. Otherwise, when the A/F is too fuel rich, a purification rate of nitrogen oxides increases but the purification rate of hydrocarbons and carbon monoxide decreases. Similarly, when the A/F is too air rich, the purification rate of nitrogen oxides decreases and the purification rate of hydrocarbons and carbon monoxide increases.

The A/F ratio may be stoichiometrically balanced with an oxygen storage capacity (OSC) material. The OSC material absorbs oxygen when the oxygen concentration in exhaust gas is high and releases oxygen when the oxygen concentration of the exhaust gas is low. When the OSC material absorbs a substantial amount of oxygen, the OSC material must be regenerated so that it once again may absorb oxygen (referred to herein as a reactivation period).

In automobile applications, three-way catalytic converter systems typically include a front end catalytic converter located upstream (i.e., near an engine) and a rear end catalytic converter located downstream (i.e., near an exhaust location). During the reactivation period, there is a tendency that ammonia converted from nitrogen oxides at a location upstream (e.g., at the front end catalytic converter) has the potential to be re-oxidized to nitrogen oxides at a location downstream (e.g., at the rear end catalytic converter). This is believed to be a result of conventional three-way catalysts having low selectivity to nitrogen.

These issues related to achieving proper A/F ratios with OSC materials and controlling the composition of exhaust are addressed by the present disclosure.

SUMMARY

This section provides a general summary of the disclosure and is not a comprehensive disclosure of its full scope or all of its features.

In a form, a method of reactivating oxygen storage capacity (OSC) materials in a catalytic converter system includes monitoring an exhaust gas oxygen concentration entering at least a portion of a first catalyst containing OSC material, monitoring an exhaust gas oxygen concentration entering at least a portion of a second catalyst containing OSC material, and monitoring exhaust gas oxygen and nitrogen oxides of an exhaust of the catalytic converter system. An OSC reactivation time and an OSC reactivation rate based on a reactivation lambda (λ) setpoint, $\text{Imd}_{react}$, for reactivation of the first catalyst containing OSC material and calculating an OSC reactivation time and an OSC reactivation rate based on reactivation lambda setpoint, $\text{Imd}_{react}$, for reactivation of the second catalyst containing OSC material are calculated. The first catalyst containing OSC material is reactivated when excess exhaust gas oxygen is detected after the first catalyst containing OSC material until the amount of oxygen stored in the first catalyst containing OSC material is less than or equal to a predetermined value and excess exhaust gas oxygen is not detected after the second catalyst containing OSC material. The second catalyst containing OSC material is reactivated when excess exhaust gas oxygen is detected after the second catalyst containing OSC material until the amount of oxygen stored in the second catalyst containing OSC material is less than or equal to a predetermined value and nitrogen oxide or excess oxygen is not detected in the exhaust of the catalytic converter system.

In a variation, reactivating the second catalyst containing OSC material include completely reducing the first catalyst containing OSC material. In other such variations, reactivating the second catalyst containing OSC material includes reducing the second catalyst containing OSC material to half capacity.

In another variation, reactivation is triggered when an engine coolant temperature is greater than 80° C. and net lean engine operation occurs for a time period greater than or equal to a pre-determined value of greater than or equal to about 1 millisecond to less than or equal to about 3 seconds.

In a further variation, the $\text{Imd}_{react}$ for reactivating the first catalyst containing OSC material is less than or equal to about 0.98.

In yet another variation, the $\text{Imd}_{react}$ for reactivating the second catalyst containing OSC material is less than or equal to about 0.98.

In a still further variation, reactivating the first catalyst containing OSC material includes reducing the first catalyst containing OSC material to half capacity.

In another form, a method of diagnosing a failure event of excess nitrogen oxide exhaust in a catalytic converter system includes monitoring, at an exhaust location of the catalytic converter system, an exhaust gas oxygen and nitrogen oxides. At least one of the lambdas functions and an exhaust gas oxygen breakthrough at the exhaust location of the catalytic converter system is measured. When the lambda function at the exhaust location of the catalytic converter system is greater than or equal to one, or an amount of the nitrogen oxides present at the exhaust location of the catalytic converter system is determined, an alert is issued when the amount of nitrogen oxides is greater than or equal to a predetermined level.

In a variation, the catalytic converter system includes a first OSC material and a second OSC material. The exhaust gas oxygen of the first OSC material and the exhaust gas oxygen of the second OSC material are monitored, and it is determined whether a temperature of the second OSC material is greater than or equal to 450° C.

In another variation, the exhaust gas oxygen level before and after a first OSC material and the exhaust gas oxygen level after a second OSC material are monitored, and a condition to initiate an OSC reactivation event that is triggered when excess exhaust gas oxygen breaks through from the first OSC material and the second OSC material for a predetermined duration is determined.

In a further variation, an exhaust gas oxygen level before and after a first OSC material and an exhaust gas oxygen level after a second OSC material are monitored. A condition for nitrogen oxide remake during the OSC reactivation event when ammonia breaks through from the first OSC material and is re-oxidized to nitrogen oxide over the second OSC material is determined. The OSC reactivation time period during which nitrogen oxide remake is occurring and determining whether the total nitrogen oxide accumulated during OSC reactivation is greater than a threshold value is calculated.

In a further form, a catalytic converter system includes a first three-way catalyst and a second three-way catalyst downstream the first three-way catalyst. Each three-way catalyst includes a substrate layer, an OSC layer disposed on the substrate layer, and a rhodium layer disposed on the OSC layer. The OSC layer of the second three-way catalyst comprises platinum-palladium/ceria-zirconia.

In a variation, the ratio of platinum to palladium is between 0.33 and 1.

In another variation, the ratio of ceria to zirconia is between 1 and 3.

In yet another variation, the OSC layer of the first three-way catalyst comprises platinum-palladium/ceria-zirconia. In yet other such variations, the ratio of platinum to palladium is between 0.33 and 1. In still other such variations, the ratio of ceria to zirconia is between 1 and 3.

In a further variation, the first three-way catalyst comprises an upstream zone comprising palladium/ceria-zirconia and a downstream zone comprising platinum-palladium/ceria-zirconia. In yet other such variations, the ratio of platinum to palladium is between 0.33 and 1. In still other such variations, the ratio of ceria to zirconia is between 1 and 3.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
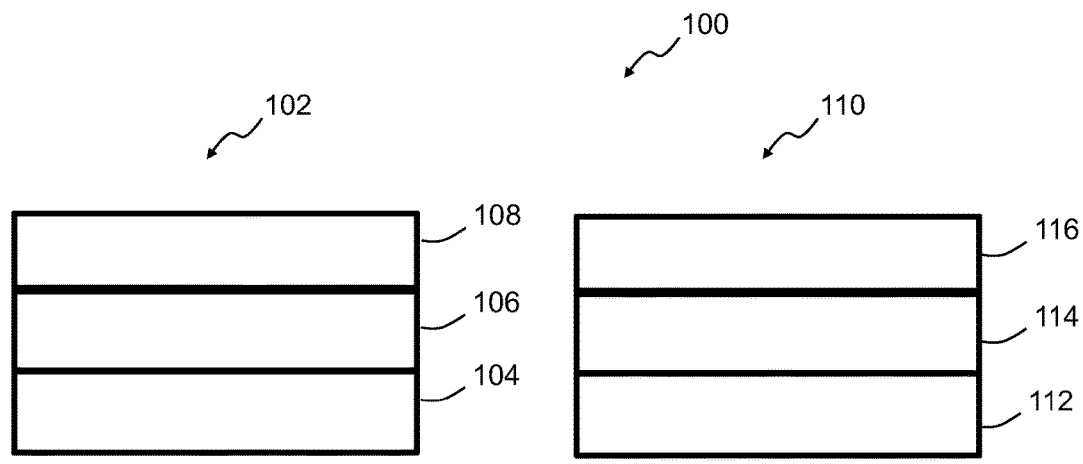
FIG. 1 is a schematic diagram of a catalytic converter system according to a form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides OSC materials. The OSC materials may include catalysts formed of ceria-zirconia (CZO) impregnated with precious group metals (PGM) (such catalysts referred to herein as PGM/CZO catalysts) that can reach a theoretical maximum OSC (i.e., all of the cerium ions of the PGM/CZO catalyst are reduced from $Ce^{4+}$ to $Ce^{3+}$). In a variation, the CZO is in a tetragonal phase. In another variation, the CZO is in the pyrochlore phase. In a variation, the catalysts formed according to the present disclosure can reach a maximum OSC of greater than or equal to about 90% of a theoretical maximum OSC. In a further variation, the catalysts formed according to the present disclosure can reach a maximum OSC greater than or equal to about 80% of a theoretical maximum OSC. In a further variation, the catalysts formed according to the present disclosure can reach a maximum OSC greater than or equal to about 70% of a theoretical maximum OSC. In a further variation, the catalysts formed according to the present disclosure can reach a maximum OSC greater than or equal to about 60% of a theoretical maximum OSC. Further, the catalysts according to the present disclosure also exhibit adequate light-off characteristics.

Where using CZO materials is contemplated, suitable CZO materials have a molar ratio of cerium(IV) oxide (also known as "ceria") to zirconium oxide (also known as "zirconia") of 1:1. In a variation, the ratio of ceria to zirconia is between 1 and 3. In a variation, the molar ratio of cerium(IV) oxide to zirconium oxide of greater than or equal to about 0.67:1 to less than or equal to about 1.5:1 such that the CZO material is in the tetragonal phase. Further, suitable CZO materials exhibit surface areas of greater than or equal to about 80 $m^2/g$.

Suitable PGMs include palladium, nickel, platinum, rhodium, gold, iridium, and combinations thereof. According to a variation, the PGM comprises palladium.

The catalysts may be prepared according to known methods. For example, when the catalyst includes a PGM/CZO catalyst, a CZO material is mixed with a PGM precursor. The PGM precursor may comprise a nitrate solution, such as $Pd(NO_3)_2$ or $Pt(NO_3)_2$, acetate solutions, or tetraamine nitrate solutions, among others. In a variation, the PGM in the PGM precursor is at about 0.6 wt. %. In another variation, the PGM in the PGM precursor is at greater than or equal to about 0.1 wt. % to less than or equal to about 1 wt. %. The CZO material may be in the form of a powder or other medium such that the CZO material readily mixes with the PGM precursor. After mixing, the CZO material and the PGM precursor solution is calcined by heating the solution in an environment at a temperature of greater than or equal to about 500° C. to less than or equal to about 600° C. for greater than or equal to about 1 hour to less than or equal to about 2 hours to form a PGM/CZO catalyst.

After calcination, the PGM/CZO catalyst optionally is then coated onto a substrate. In a variation, the PGM/CZO catalyst, along with fillers (e.g., alumina fibers) to provide desirable mechanical or thermal properties, is extruded to form a part for use in a catalytic converter application.

The substrate may be comprised of a variety of materials, including ceramics and metal materials. Non-limiting examples of ceramics include cordierite, cordierite-alpha alumina, silicon nitrides, zircon mullites, silicates, and among others. Examples of metal materials include corrosion-resistant refractory metals based on stainless steel or iron.

The substrate may take on any desirable shape, such as a pellet shape, and a honeycomb shape, among others. In a form, the substrate may be a honeycomb-shaped cordierite. As used herein, a honeycomb shape is intended to refer to a monolithic structure having a plurality of passages extending therethrough. It is contemplated that coating the substrate would include coating the passages.

After the catalyst is coated over the substrate, a rhodium layer is applied over the catalyst coating the substrate. The rhodium layer may be a rhodium-containing layer comprising rhodium. In a variation, the rhodium-containing layer is supported on alumina, ceria, and/or zirconia, among others.

Figure 2:
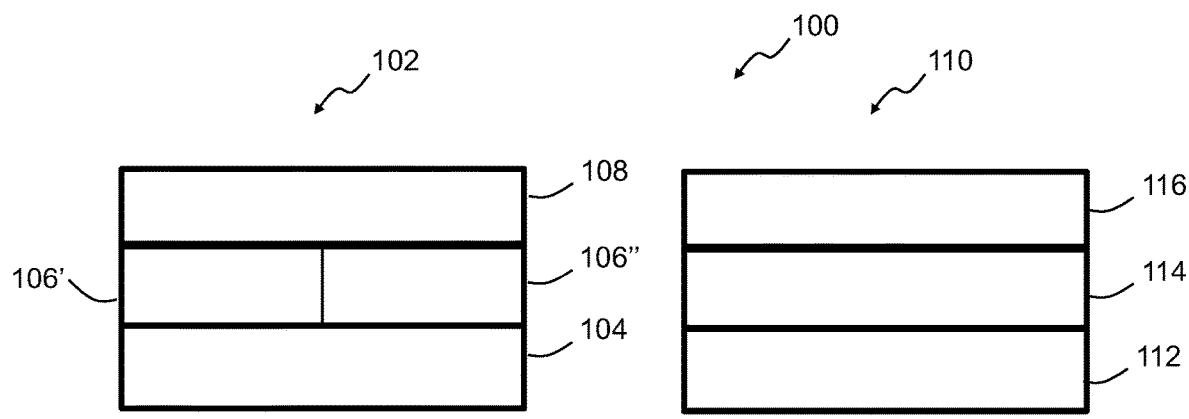
FIG. 2 is a schematic diagram of a catalytic converter system according to another form of the present disclosure.

Referring to FIG. 1, a catalytic converter system 100 according to a form is disclosed. The catalytic converter system 100 includes a first catalytic converter 102 (also referred to as a first three-way catalyst) having a substrate 104, a catalyst layer 106 (also referred to herein as an OSC material 106 or an OSC catalyst containing material) disposed over the substrate 104, and a layer of rhodium 108 disposed over the catalyst layer 106. In a variation, the catalyst layer 106 comprises a palladium/CZO layer. In another variation, the catalyst layer 106 comprises a PGM/CZO layer. The catalytic converter system 100 further includes a second catalytic converter 110 (also referred to as a second three-way catalyst), located downstream of the first catalytic converter 102, having a substrate 112, a catalyst layer 114 (also referred to herein as an OSC material 114 or an OSC catalyst containing material) disposed over the substrate 112, and a layer of rhodium 116 disposed over the catalyst layer 114. In a variation, the catalyst layer 114 comprises a platinum-palladium/CZO layer. In another variation, the catalyst layer 114 comprises a PGM-platinum/CZO layer. In yet another variation, the catalyst layer 114 comprises a platinum/CZO layer. In a variation, and with reference to FIG. 2, the catalyst layer 106 included in the first catalytic converter includes an upstream catalyst layer 106' and a downstream catalyst layer 106". In a variation, the upstream catalyst layer 106' comprises a palladium/CZO layer. In another variation, the upstream catalyst layer 106' comprises a PGM/CZO layer. In a variation, the catalyst layer downstream 106" comprises a platinum-palladium/CZO layer. In another variation, the downstream catalyst layer 106" comprises a PGM-platinum/CZO layer. In yet another variation, the downstream catalyst layer 106" comprises a platinum/CZO layer. In a variation, the ratio of platinum to palladium is between 0.33 and 1. Where a platinum-palladium/CZO layer forms either or both of the catalyst layer 106 or 114, it is believed that catalytic converter systems minimizes nitrogen remake, as described more fully below.

Figure 3:
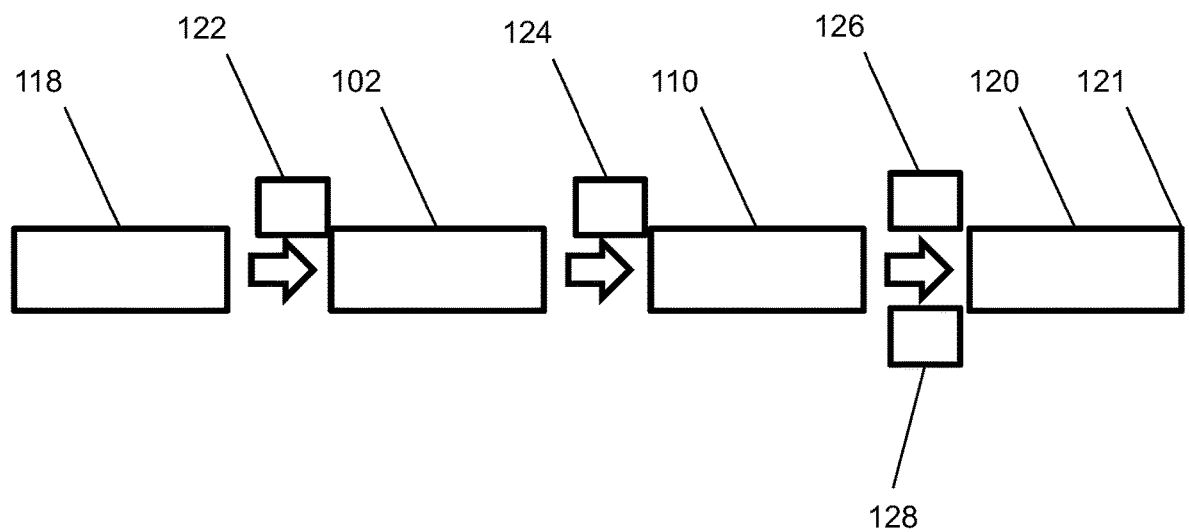
FIG. 3 is a schematic diagram of an automobile exhaust system.

Turning to FIG. 3, the catalytic converter system 100 is located downstream of an engine 118 and upstream of at least a portion of an exhaust system 120, e.g., upstream from a distal end 121 of an exhaust system. A first exhaust gas oxygen sensor 122 monitors an exhaust gas oxygen concentration entering the first catalytic converter 102 and is disposed near an upstream end of the first catalytic converter 102 and downstream of the engine 118. A second exhaust gas oxygen sensor 124 monitors an exhaust gas oxygen concentration entering the second catalytic converter 110 and is disposed near an upstream end of the second catalytic converter 110 and downstream of the first catalytic converter 102. A third exhaust gas oxygen sensor 126 monitors an exhaust gas oxygen concentration exiting the second catalytic converter 110 and is disposed downstream of the second catalytic converter 110 and upstream of the distal end 121 of the exhaust system 120. A nitrogen oxide sensor 128 monitors nitrogen oxides exiting the second catalytic converter 110 and is also disposed downstream of the second catalytic converter 110 and upstream of the exhaust system 120.

Each of the exhaust oxygen sensors are further configured (e.g., with a computer) to calculate a lambda function of the actual A/F ratio divided by the stoichiometric A/F ratio. In other words, each of the exhaust oxygen sensor measurements are used to calculate OSC reactivation time and OSC reactivation rate based on or for a reactivation lambda setpoint, $Imd_{react}$, for reactivation of its corresponding OSC material. For example, the first exhaust gas oxygen sensor 122 and the second exhaust gas oxygen sensor 124 are used to calculate the OSC reactivation time and OSC reactivation rate based on a reactivation lambda setpoint, $Imd_{react}$, for reactivation of the first OSC material 106; and the second exhaust gas oxygen sensor 124 and the third exhaust gas oxygen sensor 126 are used to calculate the OSC reactivation time and OSC reactivation rate based on a reactivation lambda setpoint, $Imd_{react}$, for reactivation of the second OSC material 114.

Figure 4:
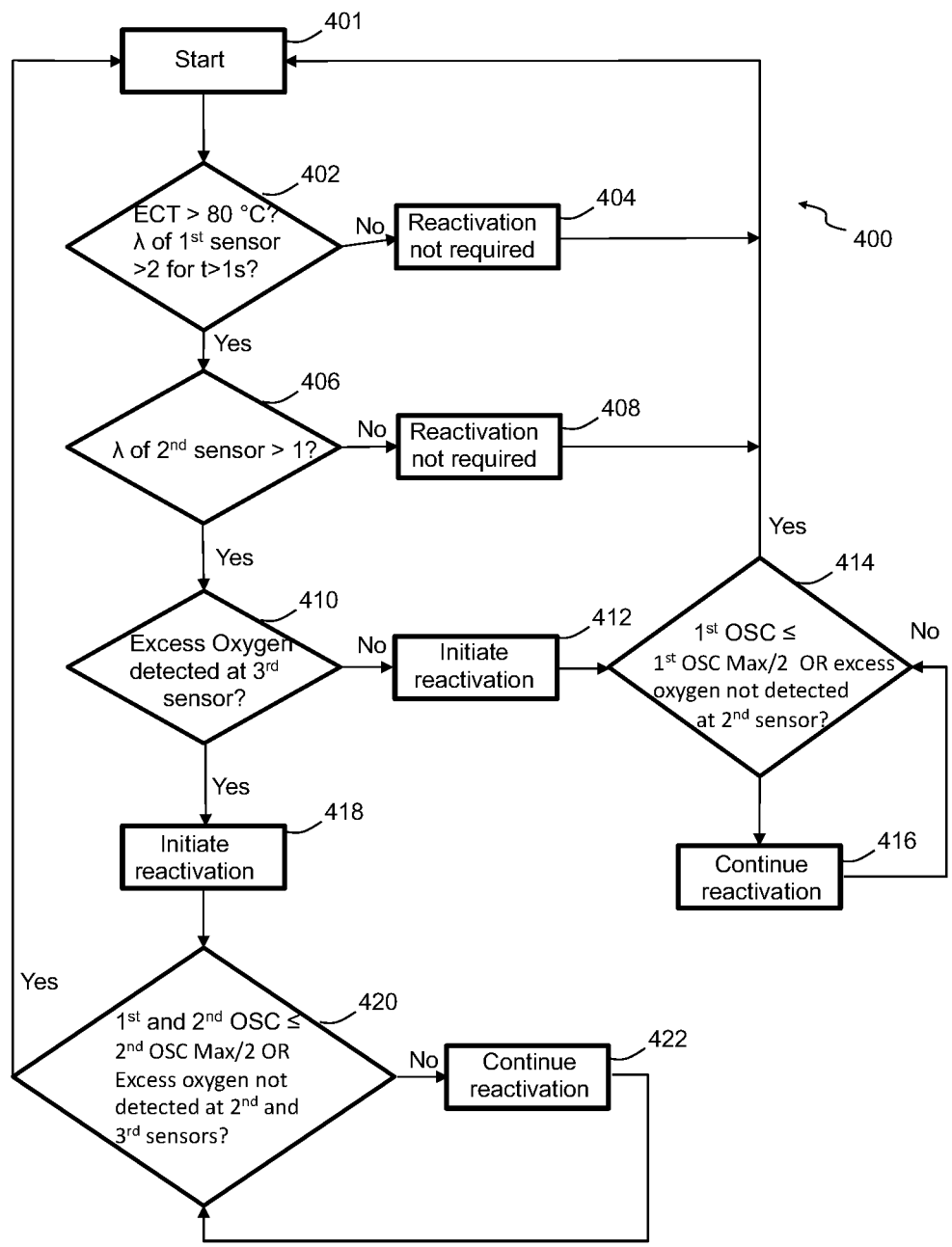
FIG. 4 is a flowchart for a method of regenerating oxygen storage capacity (OSC) materials in a catalytic converter system.

Referring to FIG. 4, a flow chart for a method 400 for reactivating the three-way catalysts of the first catalytic converter 102 and the second catalytic converter 110 starts at step 401. As noted above, each of the gas exhaust oxygen sensors monitor exhaust gas oxygen concentration and calculate OSC reactivation time and OSC reactivation rate based on a reactivation lambda setpoint, $Imd_{react}$, for reactivation of its corresponding OSC material. The method 400 progresses to step 402, where it is determined whether the engine coolant temperature (ECT) of the catalytic converter system 110 is above 80° C. and determining whether the lambda function of the amount of oxygen detected at the first exhaust gas oxygen sensor 124 is greater than or equal to about 2 for greater than about 1 second at step 402 (e.g., where net lean engine operation occurs for a time period greater than or equal to a pre-determined value, which may range from a few milliseconds to several seconds). If either the catalytic converter system 110 is not above 80° C., or the lambda function is less than about 2 for greater than about 1 second, the method 400 ends at 404 and the method may revert to step 401, e.g., after a predetermined period of time. If, on the other hand, the catalytic converter system 110 is above 80° C., and the lambda function is greater than about 2 for greater than about 1 second, the method 400 proceeds to step 406.

At step 406, it is determined whether the amount of oxygen detected at the second exhaust gas oxygen sensor 128 is greater than the stoichiometric amount of oxygen or excess oxygen or the lambda function is greater than one. If not, the method 400 ends at 408 and the method may revert to step 401, e.g., after a predetermined period of time. If, however, it is determined the amount of oxygen detected at the second exhaust gas oxygen sensor is greater than the stoichiometric amount of oxygen, or the lambda function is greater than one, then the OSC material of the first catalytic converter 102 is fully oxidized and the method 400 proceeds to step 410.

At step 410, it is determined whether excess oxygen is detected at the third exhaust gas oxygen sensor 126. If not, reactivation of the OSC material of the first catalytic converter 102 begins at step 412. In so doing, the first OSC material (e.g., the OSC material 106) is reactivated until the calculated amount of oxygen stored in the first OSC material is less than or equal to a predetermined value or excess exhaust gas oxygen is not detected after the second OSC material (e.g., the OSC material 114), and the method proceeds to step 414. At step 414, it is determined whether either (1) the lambda function dependent upon the oxygen level of the OSC material of the first catalytic converter 102 is less than or equal to the theoretical maximum of the OSC material divided by two; or (2) excess oxygen is no longer detected at the second exhaust gas sensor 124. If not, the method 400 proceeds to step 416, where reactivation continues for a predetermined time, then the method 400 reverts to step 414. The predetermined time may be selected to decrease reactivation time with a corresponding decrease in reactivation lambda setpoint, $Imd_{react}$, to prepare the three-way catalyst for its next transient event. As noted above, reactivation may continue until the calculated amount of oxygen stored in the first OSC material is less than or equal to a predetermined value (e.g., 50% reactivated or reactivated to half capacity). As such, it is contemplated, the method 400 may revert back to step 414 as necessary until adequate reactivation has been realized. If, on the other hand, either (1) the lambda function dependent oxygen level of the OSC material of the first catalytic converter 102 is less than or equal to the theoretical maximum of the OSC material divided by two; or (2) excess oxygen is no longer detected at the second exhaust gas sensor 124, the method 400 reverts to step 401. In a variation, the OSC material is not reactivated until the $Imd_{react}$ for reactivating the first OSC material is less than 0.98. In other variations, the OSC material is not reactivated until the $Imd_{react}$ for reactivating the first OSC material is less than 0.9.

Turning back to step 410, if it is determined that oxygen is detected at the third exhaust gas oxygen sensor 126, then the OSC material of the first catalytic converter 102 and the OSC material of the second catalytic converter 110 are both fully oxidized, and the method 400 proceeds to step 418.

At step 418, reactivation begins to reactivate the OSC materials of the first catalytic converter 102 and the second catalytic converter 110. In so doing, the first OSC material and the second OSC material are reactivated until the amount of oxygen stored in the second OSC material is less than or equal to a predetermined value or excess exhaust gas oxygen is not detected in the exhaust of the catalytic converter system (e.g., the exhaust system 120 of the catalytic converter system 100). The first OSC material may become completely reactivated such that the first OSC material is completely reduced. The method 400 proceeds to step 420. At step 420, it is determined whether either (1) the lambda function dependent oxygen level of the OSC material of the first catalytic converter 102 and the lambda function dependent oxygen level of the OSC material of the second catalytic converter 110 are less than the theoretical maximum OSC material of the second catalytic converter 110 divided by two, or (2) whether excess oxygen is not detected at either of the second exhaust gas sensor 124 and the third exhaust gas sensor 126. If not, reactivation continues for a predetermined time at step 422 and the method 400 reverts to step 420. The predetermined time may be selected to decrease reactivation time with a corresponding decrease in reactivation lambda setpoint, $Imd_{react}$, to prepare the three-way catalyst for its next transient event while minimizing nitrogen oxide remake from ammonia by using a platinum-palladium-ceria zirconia as the second three-way catalyst. As noted above, reactivation may continue until the calculated amount of oxygen stored in the second OSC material is less than or equal to a predetermined value (e.g., 50% reactivated or reactivated to half capacity). As such, it is contemplated, the method 400 may revert back to step 420 as necessary until adequate reactivation has been realized. If, on the other hand, either (1) the lambda function dependent oxygen level of the OSC material of the first catalytic converter 102 and the lambda function dependent oxygen level of the OSC material of the second catalytic converter 110 are less than the theoretical maximums of the OSC material of the second catalytic converter 110 divided by two, or (2) oxygen is not detected at either of the second exhaust gas sensor 124 and the third exhaust gas sensor 126 occur, the method reverts to step 401. In a variation, the OSC material is not reactivated until the $Imd_{react}$ for reactivating the second OSC material is less than 0.98. In other variations, the OSC material is not reactivated until the $Imd_{react}$ for reactivating the second OSC is less than 0.9.

It is further contemplated that in another variation, the reactivation period can be either open loop, closed loop, or otherwise controlled. In still other variations, it is contemplated that the first catalytic converter and the second catalytic converter may comprise one catalyst having zones, where a first zone is located upstream of a second zone, and that an optional exhaust gas oxygen sensor is disposed between the two zones.

Figure 5:
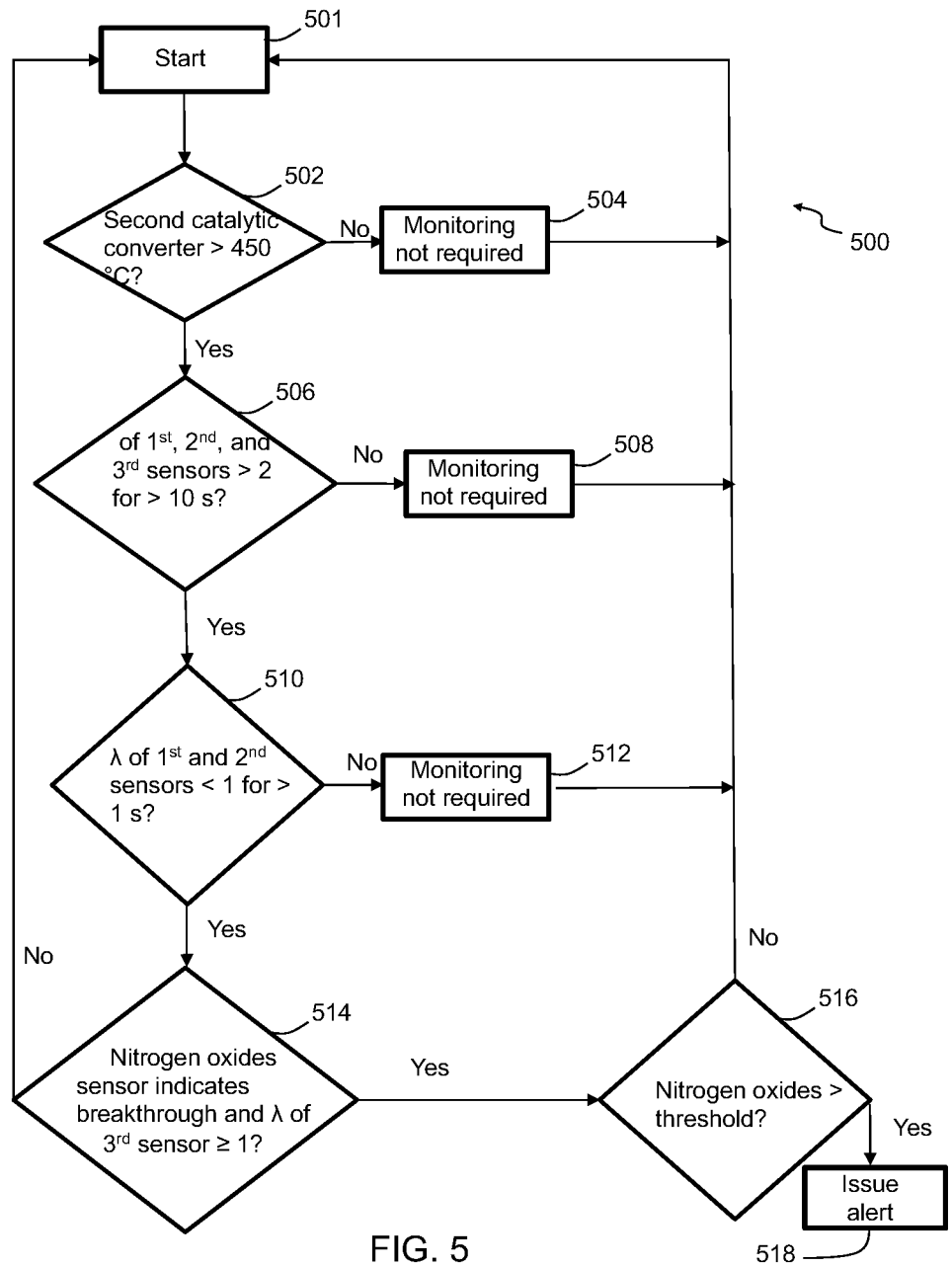
FIG. 5 is a flowchart for a method of diagnosing a failure event of excess nitrogen oxide exhaust in a catalytic converter system.

Referring to FIG. 5, a method 500 for determining a failure of the catalysts in a catalytic converter system begins at step 501. As noted above, each of the gas exhaust oxygen sensors monitor exhaust gas oxygen concentration and calculate OSC reactivation time and OSC reactivation rate based on a reactivation lambda setpoint, $Imd_{react}$, for reactivation of its corresponding OSC material. In this way, the exhaust gas oxygen level before and after a first OSC material and the exhaust gas oxygen level after a second OSC material are monitored, and it can be determined to initiate an OSC reactivation event when excess exhaust gas oxygen breaks through from the first OSC material and the second OSC material for a predetermined duration. The method 500 proceeds to step 502, where it is determined whether the second catalytic converter (e.g., the second catalytic converter 110) is at a temperature of at least 450° C. If not, no further monitoring is necessary, because the temperature is below that which the OSC materials activate, and the method 500 proceeds to step 504 and may revert to step 501.

If the second catalytic converter is at a temperature of at least 450° C., the method 500 proceeds to step 506, and it is determined whether the lambda functions of a first exhaust oxygen sensor (e.g., the first exhaust gas oxygen sensor 122), a second exhaust oxygen sensor (e.g., the second exhaust oxygen sensor 124), and a third exhaust oxygen sensor (e.g., the third gas exhaust oxygen sensor 126) exceed two for at least ten seconds. If not, no further monitoring is necessary, because no extended fuel cut event has been activated, and the method 500 proceeds to step 508 and may revert to step 501.

If the lambda functions of the first exhaust oxygen sensor, the second exhaust oxygen sensor, and the third exhaust oxygen sensor exceed two, the method 500 proceeds to step 510, and it is determined whether the lambdas of the first exhaust oxygen sensor and the second exhaust oxygen sensor are less than one for at least one second. If not, no further monitoring is necessary, because the catalytic converter system is not operating in an oxygen rich environment, and the method proceeds to step 512 and may revert to step 501.

If the lambda functions of the first exhaust oxygen sensor and the second exhaust oxygen sensor are now less than one for at least one second, catalyst reactivation is occurring and the method 500 proceeds to step 514, and the nitrogen oxide sensor (such as the nitrogen oxide sensor 128) is used to detect breakthrough of ammonia or nitrogen oxides. If the lambda function value indicated by the $3^{rd}$ oxygen sensor 126 is less than one, then no alert is necessary, as the likely result is the nitrogen oxide sensor was detecting ammonia, and the method 500 may revert to step 501.

If the lambda function value indicated by the $3^{rd}$ oxygen sensor 126 is greater than or equal to one, the method 500 proceeds to 516, and it is determined whether the lambda function exceeds a predetermined threshold. If not, no alert issues, and the method 500 may revert to step 501. If the lambda function exceeds a predetermined threshold, an alert or other warning issues, and the method 500 ends. In this manner, it can be a condition for nitrogen oxide remake during an OSC reactivation event can be determined when ammonia breaks through from the first OSC material and is re-oxidized to nitrogen oxide over the second material, the OSC reactivation time period during which nitrogen oxide remake is occurring can be calculated, and it may be determined whether the total nitrogen oxide accumulated during OSC reactivation is greater than a threshold value.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of reactivating oxygen storage capacity (OSC) materials in a catalytic converter system, the method comprising:
    monitoring an exhaust gas oxygen concentration entering at least a portion of a first catalyst containing OSC material, monitoring an exhaust gas oxygen concentration entering at least a portion of a second catalyst containing OSC material, and monitoring exhaust gas oxygen and nitrogen oxides of an exhaust of the catalytic converter system;
    calculating an OSC reactivation time and an OSC reactivation rate based on a reactivation lambda setpoint, $Imd_{react}$, for reactivation of the first catalyst containing OSC material and calculating an OSC reactivation time and an OSC reactivation rate based on reactivation lambda setpoint, $Imd_{react}$, for reactivation of the second catalyst containing OSC material;
    reactivating the first catalyst containing OSC material when excess exhaust gas oxygen is detected after the first catalyst containing OSC material until the amount of oxygen stored in the first catalyst containing OSC material is less than or equal to a predetermined value and excess exhaust gas oxygen is not detected after the second catalyst containing OSC material; and
    reactivating the second catalyst containing OSC material when excess exhaust gas oxygen is detected after the second catalyst containing OSC material until the amount of oxygen stored in the second catalyst containing OSC material is less than or equal to a predetermined value and nitrogen oxide or excess oxygen is not detected in the exhaust of the catalytic converter system.

2. The method of reactivating OSC materials in a catalytic converter system according to claim 1, wherein the reactivating the second catalyst containing OSC material comprises completely reducing the first catalyst containing OSC material.

3. The method of reactivating OSC materials in a catalytic converter system according to claim 2, wherein the reactivating the second catalyst containing OSC material comprises reducing the second catalyst containing OSC material to half capacity.

4. The method of reactivating OSC materials in a catalytic converter system according to claim 1, wherein reactivation is triggered when an engine coolant temperature is greater than 80° C. and net lean engine operation occurs for a time period greater than or equal to a pre-determined value of greater than or equal to about 1 millisecond to less than or equal to about 3 seconds.

5. The method of reactivating OSC materials in a catalytic converter system according to claim 1, wherein the $Imd_{react}$ for reactivating the first catalyst containing OSC material is less than or equal to about 0.98.

6. The method of reactivating OSC materials in a catalytic converter system according to claim 1, wherein the $Imd_{react}$ for reactivating the second catalyst containing OSC material is less than or equal to about 0.98.

7. The method of reactivating OSC materials in a catalytic converter system according to claim 1, wherein reactivating the first catalyst containing OSC material comprises reducing the first catalyst containing OSC material to half capacity.

8. The method of reactivating OSC materials in a catalytic converter system according to claim 1, wherein the OSC material of the first catalyst comprises platinum-palladium/ceria-zirconia.

9. The method of reactivating OSC materials in a catalytic converter system according to claim 8, wherein the ratio of platinum to palladium is between 0.33 and 1.

10. The method of reactivating OSC materials in a catalytic converter system according to claim 8, wherein the ratio of ceria to zirconia is between 1 and 3.

11. The method of reactivating OSC materials in a catalytic converter system according to claim 1, wherein the OSC material of the second catalyst comprises platinum-palladium/ceria-zirconia.

12. The method of reactivating OSC materials in a catalytic converter system according to claim 11, wherein the ratio of platinum to palladium is between 0.33 and 1.

13. The method of reactivating OSC materials in a catalytic converter system according to claim 11, wherein the ratio of ceria to zirconia is between 1 and 3.

14. A method of reactivating oxygen storage capacity (OSC) materials in a catalytic converter system, the method comprising:
monitoring an exhaust gas oxygen concentration entering at least a portion of a first catalyst containing OSC material, monitoring an exhaust gas oxygen concentration entering at least a portion of a second catalyst containing OSC material, and monitoring exhaust gas oxygen and nitrogen oxides of an exhaust of the catalytic converter system;
calculating an OSC reactivation time and an OSC reactivation rate based on a reactivation lambda setpoint, $Imd_{react}$, for reactivation of the first catalyst containing OSC material and calculating an OSC reactivation time and an OSC reactivation rate based on reactivation lambda setpoint, $Imd_{react}$, for reactivation of the second catalyst containing OSC material;
reactivating the first catalyst containing OSC material when excess exhaust gas oxygen is detected after the first catalyst containing OSC material until the amount of oxygen stored in the first catalyst containing OSC material is less than or equal to a predetermined value and excess exhaust gas oxygen is not detected after the second catalyst containing OSC material; and
reactivating the second catalyst containing OSC material when excess exhaust gas oxygen is detected after the second catalyst containing OSC material until the amount of oxygen stored in the second catalyst containing OSC material is less than or equal to a predetermined value and nitrogen oxide or excess oxygen is not detected in the exhaust of the catalytic converter system,
wherein the OSC material of the first catalyst comprises platinum-palladium/ceria-zirconia, and
wherein the OSC material of the second catalyst comprises platinum-palladium/ceria-zirconia.

15. The method of reactivating OSC materials in a catalytic converter system according to claim 14, wherein the reactivating the second catalyst containing OSC material comprises completely reducing the first catalyst containing OSC material.

16. The method of reactivating OSC materials in a catalytic converter system according to claim 15, wherein the reactivating the second catalyst containing OSC material comprises reducing the second catalyst containing OSC material to half capacity.

17. The method of reactivating OSC materials in a catalytic converter system according to claim 14, wherein reactivation is triggered when an engine coolant temperature is greater than 80° C. and net lean engine operation occurs for a time period greater than or equal to a pre-determined value of greater than or equal to about 1 millisecond to less than or equal to about 3 seconds.

18. The method of reactivating OSC materials in a catalytic converter system according to claim 14, wherein the $Imd_{react}$ for reactivating the first catalyst containing OSC material is less than or equal to about 0.98.

19. The method of reactivating OSC materials in a catalytic converter system according to claim 14, wherein the $Imd_{react}$ for reactivating the second catalyst containing OSC material is less than or equal to about 0.98.

20. The method of reactivating OSC materials in a catalytic converter system according to claim 14, wherein reactivating the first catalyst containing OSC material comprises reducing the first catalyst containing OSC material to half capacity.

* * * * *